(12) United States Patent
Nishida et al.

(10) Patent No.: US 6,295,211 B1
(45) Date of Patent: Sep. 25, 2001

(54) SWITCHING POWER SUPPLY UNIT HAVING DELAY CIRCUIT FOR REDUCING SWITCHING FREQUENCY

(75) Inventors: Akio Nishida, Kyoto; Ryota Tani, Otokuni-gun; Koji Nakahira, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/481,490

(22) Filed: Jan. 11, 2000

(30) Foreign Application Priority Data

Jan. 18, 1999 (JP) .................................................. 11-009468
Sep. 7, 1999 (JP) .................................................. 11-253550

(51) Int. Cl.[7] .......................... H02M 3/335; H02M 3/24; H02M 5/42; H02M 7/155
(52) U.S. Cl. .............................. 363/19; 363/97; 363/131
(58) Field of Search ................. 363/18, 19, 95, 363/97, 131; 323/902

(56) References Cited

U.S. PATENT DOCUMENTS

| | | | |
|---|---|---|---|
| 3,839,659 | * 10/1974 | Bruijning et al. | 315/209 SC |
| 3,914,672 | * 10/1975 | Kiwaki et al. | 318/246 |
| 4,862,338 | * 8/1989 | Tanaka | 363/19 |
| 5,012,399 | * 4/1991 | Takemura et al. | 363/18 |
| 5,745,353 | * 4/1998 | Sato et al. | 363/56 |
| 5,943,222 | * 8/1999 | Ogawa | 363/19 |
| 5,995,382 | * 11/1999 | Miyazaki et al. | 363/19 |
| 5,995,385 | * 11/1999 | Shimamura | 363/21 |
| 6,038,143 | * 3/2000 | Miyazaki et al. | 363/19 |

* cited by examiner

*Primary Examiner*—Peter S. Wong
*Assistant Examiner*—Bao Q. Vu
(74) *Attorney, Agent, or Firm*—Ostrolenk, Faber, Gerb & Soffen, LLP

(57) ABSTRACT

A switching power supply unit includes a DC power supply, a transformer having a primary winding, a secondary winding and a feedback winding, a main switching element connected in series to the primary winding, and a control circuit connected between the feedback winding and the control terminal of the main switching element, so that a DC output can be obtained. In this switching power supply unit, there are provided a voltage generating unit disposed on the primary side of the transformer to output a voltage according to a load power, and a delay circuit for reducing the switching frequency by delaying the turn-on of the main switching element according to a voltage output from the voltage generating unit thereby to prolong the OFF time of the main switching element.

11 Claims, 8 Drawing Sheets

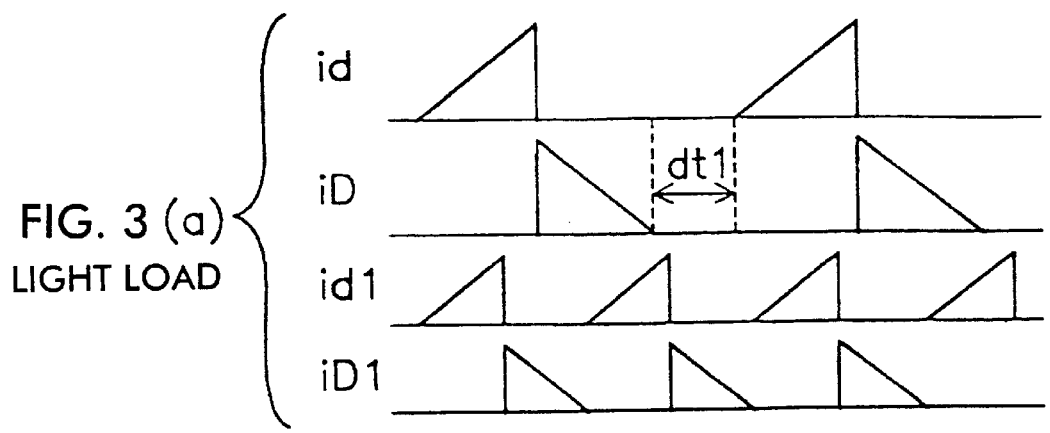
FIG. 3 (a) LIGHT LOAD
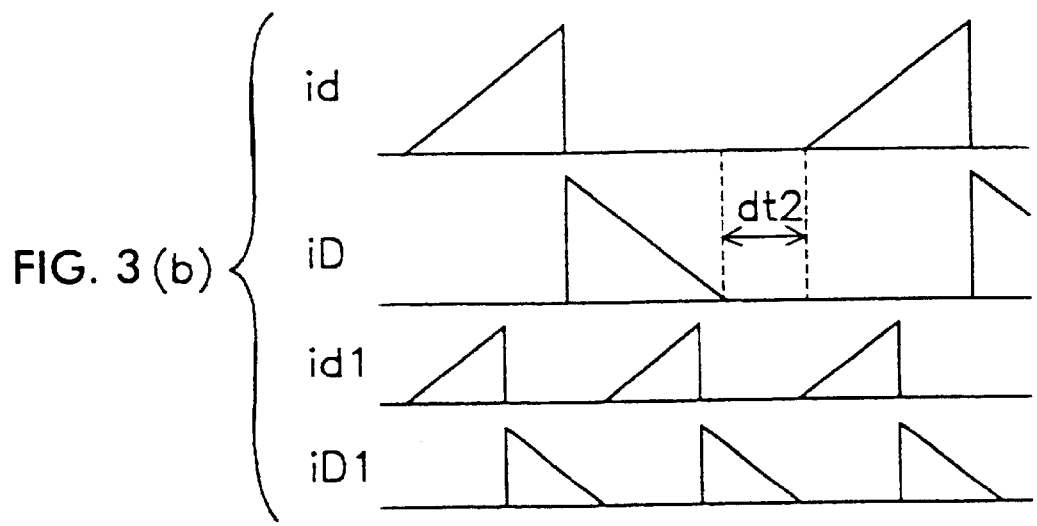
FIG. 3 (b)
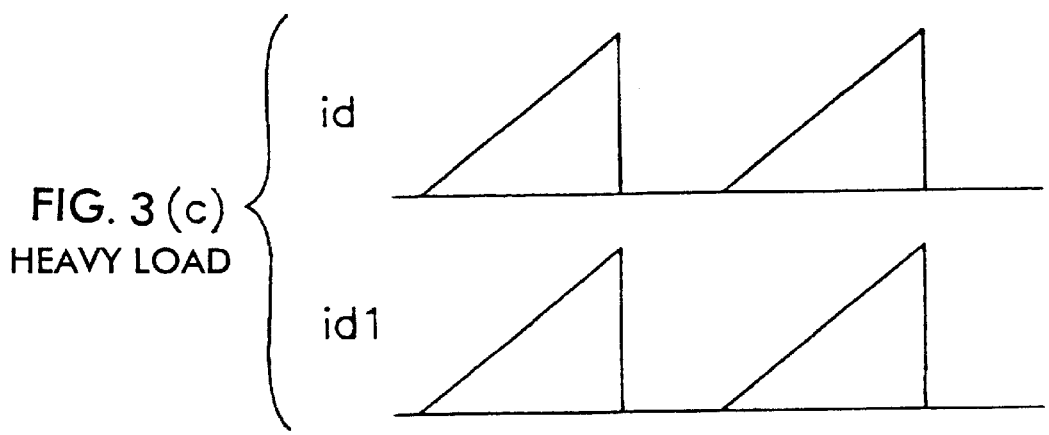
FIG. 3 (c) HEAVY LOAD

SWITCHING POWER SUPPLY UNIT HAVING DELAY CIRCUIT FOR REDUCING SWITCHING FREQUENCY

BACKGROUND OF THE INVENTION

1. Field of the Invention

The present invention relates to a switching power supply unit, and more particularly, it relates to a switching power supply unit of a ringing choke converter (hereinafter referred to as an RCC) system.

2. Description of the Related Art

In general, electronic equipment such as an electronic calculator or a communication device needs a stable DC voltage. Thus, in order to supply the stable DC voltage from a commercial AC power supply, a switching power supply unit of the RCC system, in which relatively easy formation can be conducted to obtain high efficiency, has been widely used. The structure of such a switching power supply unit will be illustrated referring to FIG. 8.

In this figure, reference numeral 10 indicates a switching power supply unit, which has an input circuit 2, a DC-DC converter circuit 3, a voltage detection circuit 4 and a control circuit 5.

Among these components, the input circuit 2 has a fuse F connected to an AC power supply AC, a filter circuit LF, and a rectifying diode bridge DB.

Additionally, the DC-DC converter circuit 3 has a smoothing capacitor C1 disposed between the output ends of the diode bridge DB of the input circuit 2, a transformer having a primary winding N1, a secondary winding N2 having the polarity opposite to that of the primary winding N1, and a feedback winding Nb with the same polarity as that of the primary winding N1, an FET Q1 as a main switching element connected in series to an end of the primary winding N1 of the transformer T, a starting resistor R1 connected between the other end of the primary winding N1 and the gate as the control terminal of the FET Q1, a resistor R10 connected between the gate and the source of the FET Q1, a rectifying diode D1 connected in series to an end of the secondary winding N2 of the transformer T, and a smoothing capacitor C4 connected between both ends of the secondary winding N2.

The voltage detection circuit 4 disposed on the output side of the DC-DC converter circuit 3 includes a resistor R5, a light-emitting diode PD on the light-emitting side of a photo coupler PC, a shunt regulator Sr, and resistors R6 and R7. Among these components, the resistor R5, the light-emitting diode PD, and the shunt regulator Sr are mutually connected in series and disposed in parallel to the capacitor C4 of the DC-DC converter circuit 3. In addition, the resistors R6 and R7 are also mutually connected in series and similarly disposed in parallel to the capacitor C4. The node of the resistors R6 and R7 is connected to the shunt regulator Sr.

The control circuit 5 includes a resistor R13 and a capacitor C3 connected in series between one end of the feedback winding Nb and the gate of the FET Q1, a transistor Q2 connected between the gate and the source of the FET Q1, a resistor R2 connected between one end of the feedback winding Nb and the base of the transistor Q2, a resistor R3 and a capacitor C2 connected in parallel between the base and the emitter of the transistor Q2, a resistor R4, a diode D2, and, a photo transistor PT on the light-receiving side of the photo coupler PC, which are mutually connected in series between one end of the feedback winding Nb and the base of the transistor Q2.

Next, a description will be given of the operation of a switching power supply unit 10 having such a structure.

First, on startup, voltage is applied to the gate of the FET Q1 via the resistor R1 to turn on the FET Q1. When the FET Q1 is turned on, a power supply voltage is applied to the primary winding N1 of the transformer T, and voltage is generated in the feedback winding Nb in the same direction as that of the voltage generated in the primary winding N1, whereby the FET Q1 is rapidly turned on by a positive feedback. Under this situation, excitation energy is charged in the primary winding N1.

When the base potential of the transistor Q2 reaches a threshold, the transistor Q2 is turned on, whereas the FET Q1 is turned off. This permits the excitation energy charged in the primary winding N1 of the transformer T during the ON time of the FET Q1 to be discharged as electric energy via the secondary winding N2. The energy is supplied to a load after being rectified by the diode D1 and smoothed by the capacitor C4.

In this way, when the excitation energy charged in the primary winding N1 of the transformer T is all discharged via the secondary winding N2, voltage is again generated in the feedback winding Nb, and the FET Q1 is thereby turned on. When the FET Q1 is turned on, voltage is again applied to the primary winding N1 of the transformer T to charge excitation energy in the primary winding N1.

In the switching power supply unit 10, the above-described oscillating operation is repeated.

Under normal conditions, an output voltage on the load side is divided by the resistors R6 and R7, and the divided detection voltage is compared with a reference voltage of the shunt regulator Sr. After this comparison, the amount of fluctuations in the output voltage is amplified by the shunt regulator Sr, and current flowing through the light-emitting diode PD of the photo coupler PC changes, so that the impedance of the photo transistor PT changes according to the light-emitting amount of the light-emitting diode PD. This operation permits the time for charging/discharging the capacitor C2 to be changed, so that the output voltage is controlled to be fixed.

In the conventional switching power supply unit 10, however, as a characteristic of the RCC system, as shown in FIG. 4(d), the switching frequency of the FET Q1 varies approximately inversely with a load power. Therefore, under light load, the switching frequency is increased, and accordingly, switching losses are increased, whereas under heavy load, the switching frequency is decreased, and accordingly, conduction losses are increased. As a result, these losses lead to reduction in circuit efficiency.

SUMMARY OF THE INVENTION

Accordingly, it is an object of the present invention to provide a switching power supply unit with high circuit efficiency, in which the switching frequency is reduced under light load, whereas a switching frequency equivalent to that of a conventional switching power supply unit can be obtained under heavy load.

To this end, the present invention provides a switching power supply unit including a DC power supply, a transformer having a primary winding, a secondary winding and a feedback winding, a main switching element connected in series to the primary winding, and a control circuit connected between the feedback winding and the control terminal of the main switching element, so that a DC output can be obtained. In this switching power supply unit, there are provided a voltage generating unit disposed on the primary side of the transformer to output a voltage according to a load power, and a delay circuit for reducing the switching frequency by delaying the turn-on of the main switching element according to a voltage output from the voltage generating unit thereby prolonging the OFF time of the main switching element.

In addition, the voltage generating unit includes a rectifying and smoothing circuit connected between both ends of the feedback winding.

In addition, an auxiliary feedback winding connected between the control circuit and the control terminal of the main switching element is disposed in the transformer, and the voltage generating unit includes a rectifying and smoothing circuit connected between both ends of the auxiliary feedback winding.

Furthermore, the delay circuit includes a switching unit disposed between the feedback winding and the control terminal of the main switching element, and a time-constant circuit.

Furthermore, the time-constant circuit includes a capacitor and a resistor connected to the control terminal of the switching unit.

Furthermore, a Zener diode is connected in series to the resistor of the time-constant circuit.

Furthermore, two resistors mutually connected in parallel include the resistor of the time-constant circuit, and a Zener diode is connected in series to one of the resistors.

According to the switching power supply unit of the present invention, charging of the capacitor of the time-constant circuit is accomplished by using voltage increasing in proportion to a load power. As a result, under light load, the time for charging the capacitor of the time-constant circuit is prolonged and the turn-on of the main switching element is thereby delayed, the OFF time being prolonged, so that a switching frequency is lowered. In contrast, under heavy load, the turn-on of the main switching element is accelerated, so that the equivalent OFF time to that of a conventional switching power supply unit can be obtained.

In addition, the switching frequency under heavy load can quickly be raised and the varying-width of the switching frequency can be increased by connecting a Zener diode in series to the resistor of the time-constant circuit and by increasing the number of windings, in which voltage used for charging the capacitor of the time-constant circuit is generated.

Other features and advantages of the present invention will become apparent from the following description of the invention which refers to the accompanying drawings.

BRIEF DESCRIPTION OF THE DRAWING(S)

FIG. 3 shows waveforms illustrating drain current of the main switching element of the main power supply unit shown in FIG. 1, as well as current flowing through a rectifying diode.

DETAILED DESCRIPTION OF EMBODIMENTS OF THE INVENTION

Figure 1:
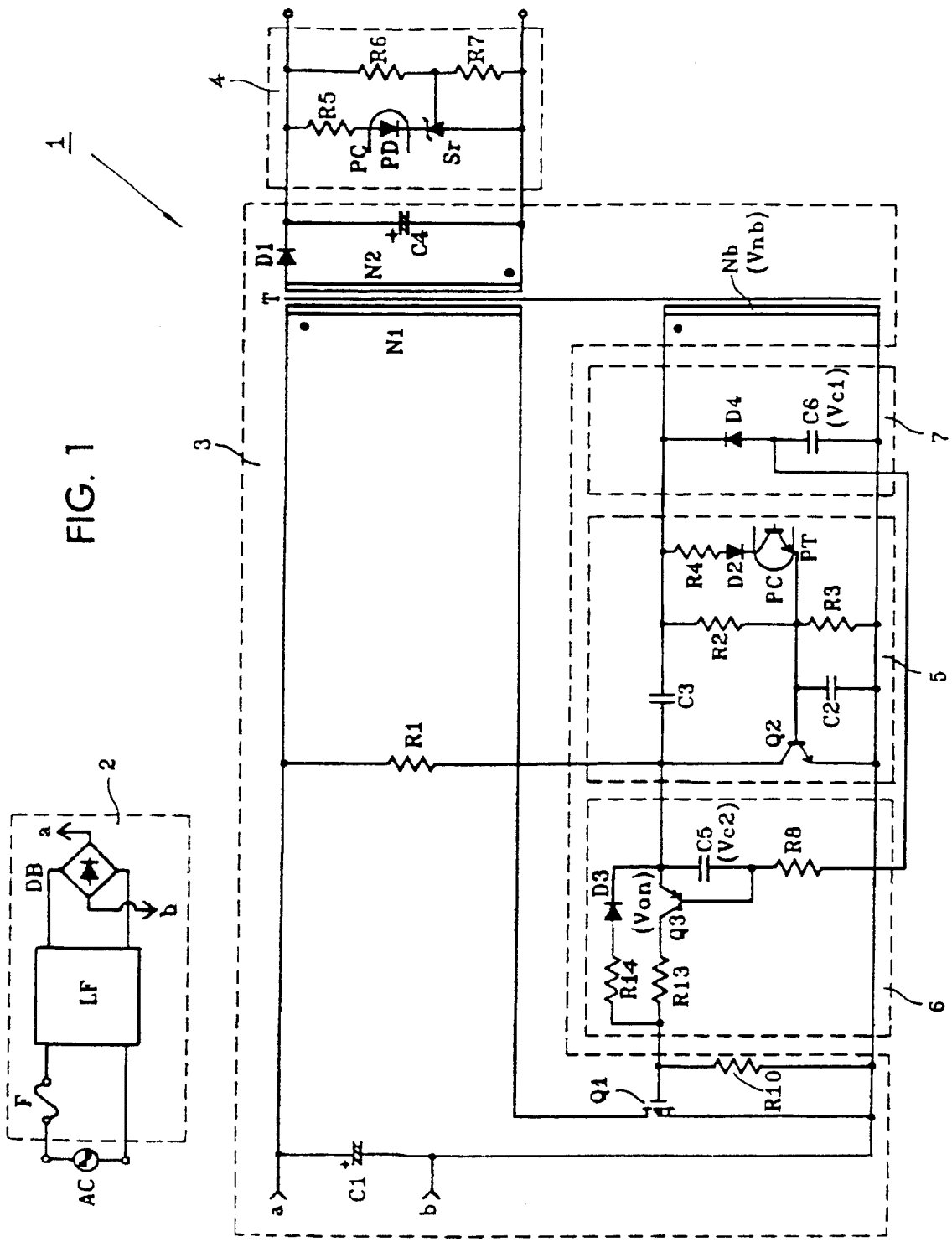
FIG. 1 is a circuit diagram of a switching power supply unit according to a first embodiment of the present invention.
Figure 8:
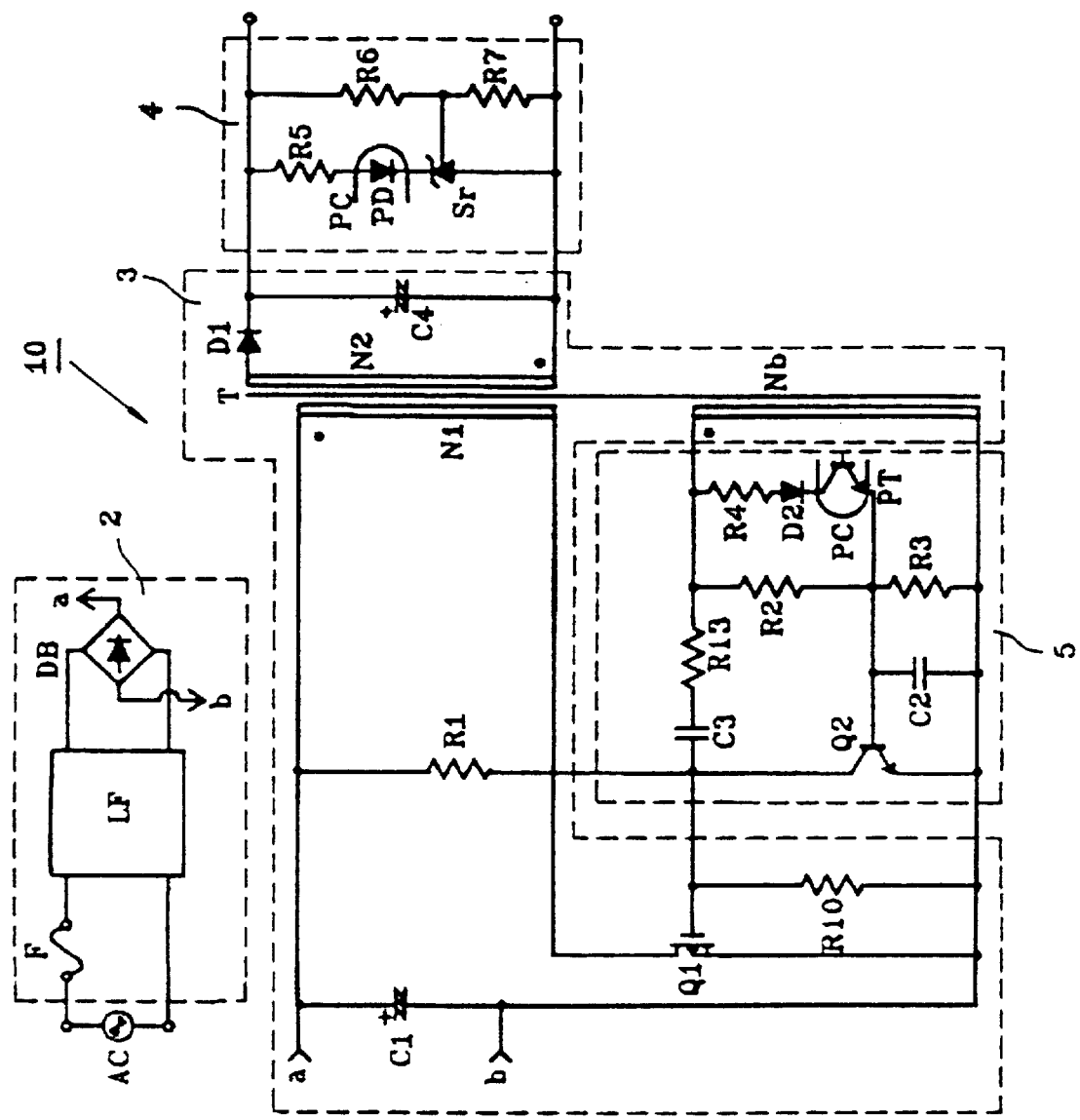
FIG. 8 is a circuit diagram showing a conventional switching power supply unit.

The structure of a switching power supply unit according to a first embodiment of the present invention will be illustrated referring to FIG. 1. The switching power supply unit 1 shown in the figure is equivalent to the switching power supply unit 10 shown in FIG. 8 in which a delay circuit 6 and a rectifying and smoothing circuit 7 are added. The other parts except for these circuits 6 and 7 are given the same reference numerals as those in FIG. 8 and detailed explanation thereof is omitted.

In FIG. 1, the delay circuit 6 of the switching power supply 1 includes a pnp-type transistor Q3 and a time-constant circuit composed of a capacitor C5 and a resistor R8. The emitter of the transistor Q3 is connected to one end of the feedback winding Nb of a transformer T via a capacitor C3 of a control circuit 5, wherein the collector thereof is connected to the gate of the FET Q1 via a resistor R13. In addition, between the emitter and the collector of the transistor Q3 is connected a series circuit of a resistor R13 and a diode D3. Furthermore, the capacitor C5 of the delay circuit is connected between the base and the emitter of the transistor Q3.

The rectifying and smoothing circuit 7 includes a rectifying diode D4 and a smoothing capacitor C6 mutually connected in series between both ends of the feedback winding Nb of the transformer T.

Next, the operation of the switching power supply unit 1 having such a structure will be illustrated. In this case, the operation of only the main part in the entire circuit will be explained.

First, with reference to FIG. 1, when the FET Q1 is turned off and the OFF time of the FET Q1 begins, the capacitor C6 of the rectifying and smoothing circuit 7 is charged by a voltage generated in the feedback winding Nb of the transformer T. Then, when energy charged in the transformer T is discharged on the secondary side and current flowing through the diode D1 on the secondary side is thereby zero, the charged voltage Vc1 of the capacitor C6 is discharged, and then, the capacitor C5 of the delay circuit 6 is charged by the charged voltage Vc1 and a voltage Vnb generated in the feedback winding Nb. After this, the charged voltage Vc2 of the capacitor C5 reaches a voltage Von at which the transistor Q3 is turned on, and the transistor Q3 is thereby turned on, so that voltage is applied to the gate of the FET Q1 to turn on the FET Q1. That is, the turn-on of the FET Q1 is delayed until the charged voltage Vc2 reaches the voltage Von.

Figure 2:
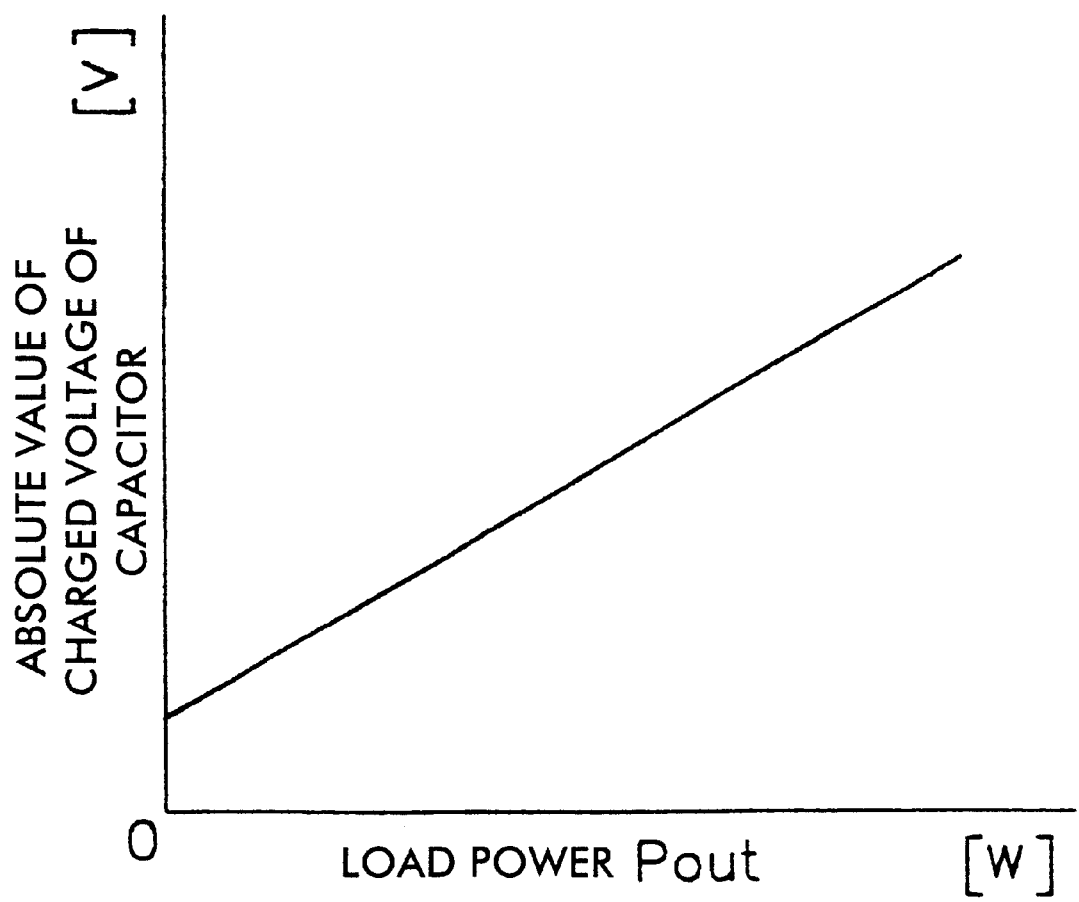
FIG. 2 is a graph showing changes in the absolute value of the charged voltage of a capacitor constituting a rectifying and smoothing circuit on the primary side of the switching power supply unit shown in FIG. 1.

Under the situation, the absolute value of the charged voltage Vc1 is increased in proportion to the load power of the switching power supply unit 1, as shown in FIG. 2, due to influence of leakage inductance of the transformer T or the like.

Therefore, under light load, the absolute value of the charged voltage Vc1 is relatively small, so that the time for the charging voltage Vc2 of the capacitor C5 the time-constant circuit to reach the voltage Von, at which the transistor Q3 is turned on, is longer. This permits the turn-on of the FET Q1 to be delayed so as to prolong the OFF time of the FET Q1, with the result that the switching frequency of the FET Q1 is reduced. In contrast, under heavy load, the absolute value of the charged voltage Vc1 is relatively large, so that the time for the charging voltage Vc2 to reach the voltage Von, is shorter. This permits the turn-on of the FET Q1 to be accelerated so as to shorten the OFF time of the FET Q1.

As described above, as the turn-on of the FET Q1 is delayed or accelerated according to the load, the drain current of the FET Q1 changes as shown in FIG. 3. This figure shows changes of the current waveform from light load to heavy load in the order of FIGS. 3(a), 3(b), and 3(c). In each of these waveforms (a), (b), and (c), the symbol id indicates the waveform of the drain current of the FET Q1, and the symbol id1 indicates the waveform of the drain current of the main switching element used in a conventional switching power supply unit, which does not have a rectifying and smoothing circuit and a time-constant circuit. In addition, the symbol iD indicates the waveform of current flowing through the rectifying diode D1 on the secondary side of the transformer T, and the symbol iD1 indicates the waveform of current flowing through the rectifying diode on the secondary side of the conventional switching power supply unit having no rectifying and smoothing circuits and no time-constant circuits.

The main switching element used in the conventional switching power supply unit performs ON/OFF operations in reverse to ON/OFF operations of the rectifying diode, in which the symbols id1 and iD1 indicate mutually reversed waveforms.

In FIGS. 3(a) and (b) where a load is relatively light, the FET Q1 of the switching power supply unit 1 is turned on with a delay time indicated by the symbols dt1 and dt2, respectively, after the turn-on of the conventional main switching element. This leads to reduction in the switching frequency. In contrast, in FIG. 3(c), where a load is relatively heavy, since the delay of the turn-on does not occur, the same waveform as that in the conventional art is obtained and the switching frequency is also equivalent to that therein.

In FIG. 3(c), the waveforms indicated by the symbols id and id1 are equal, as well as those indicated by the symbols iD and iD1 are also equal. Thus, the waveforms of iD and iD1 are omitted not to be shown in the figure.

Figure 4:
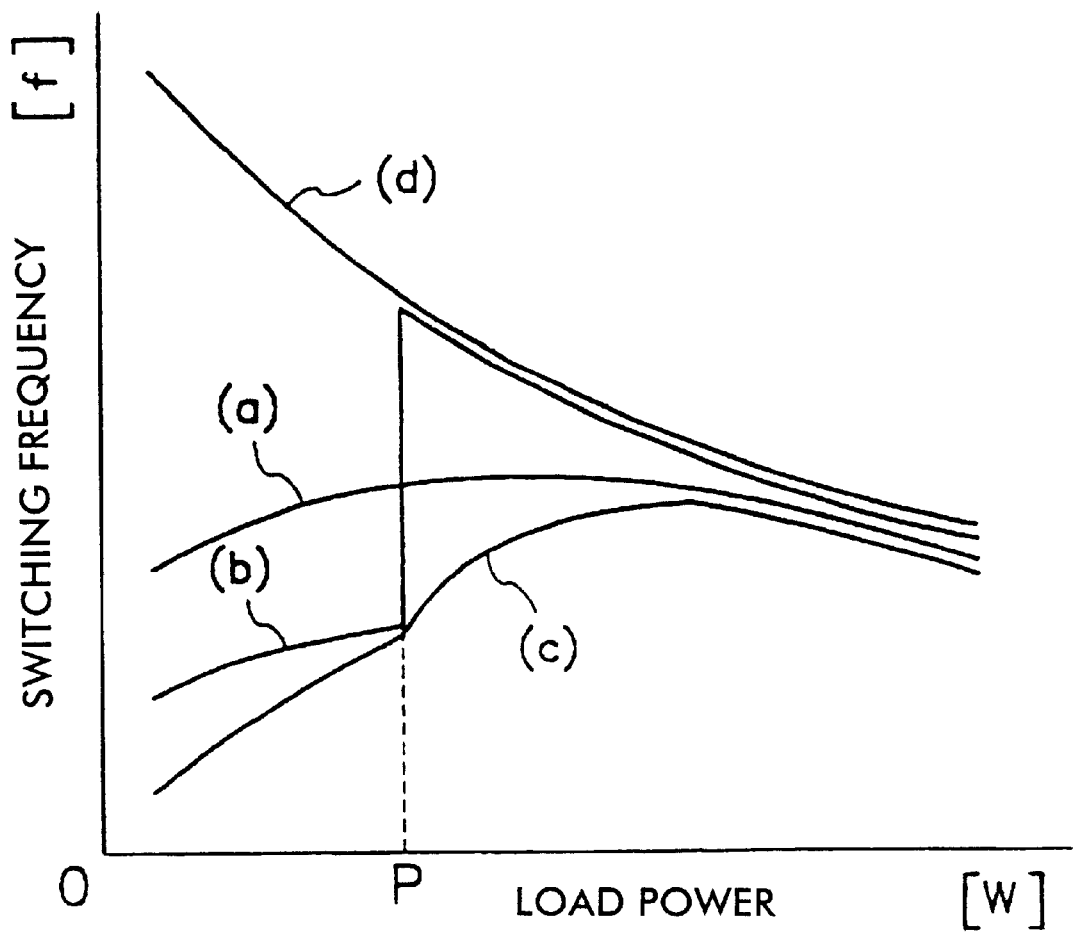
FIG. 4 is a graph showing changes in the switching frequency of the switching power supply unit in accordance with each embodiment of the present invention.

FIG. 4(a) shows changes in the switching frequency with increase in a load power in the switching power supply unit 1. Regarding the value under light load, FIG. 4(a) is much lower than FIG. 4(d) showing the frequency of the conventional switching power supply unit having no rectifying and smoothing circuits and no time-constant circuits. The former frequency slowly rises with increase in the load to show the same change as that in the frequency (d) of the conventional switching power supply unit after a certain point.

Next, a description will be given of the structure of a switching power supply unit according to a second embodiment of the present invention referring to FIG. 5. In this figure, the same reference numerals are given to the same parts as those in FIG. 1 or the equivalent parts thereto, and the explanation thereof is omitted.

Figure 5:
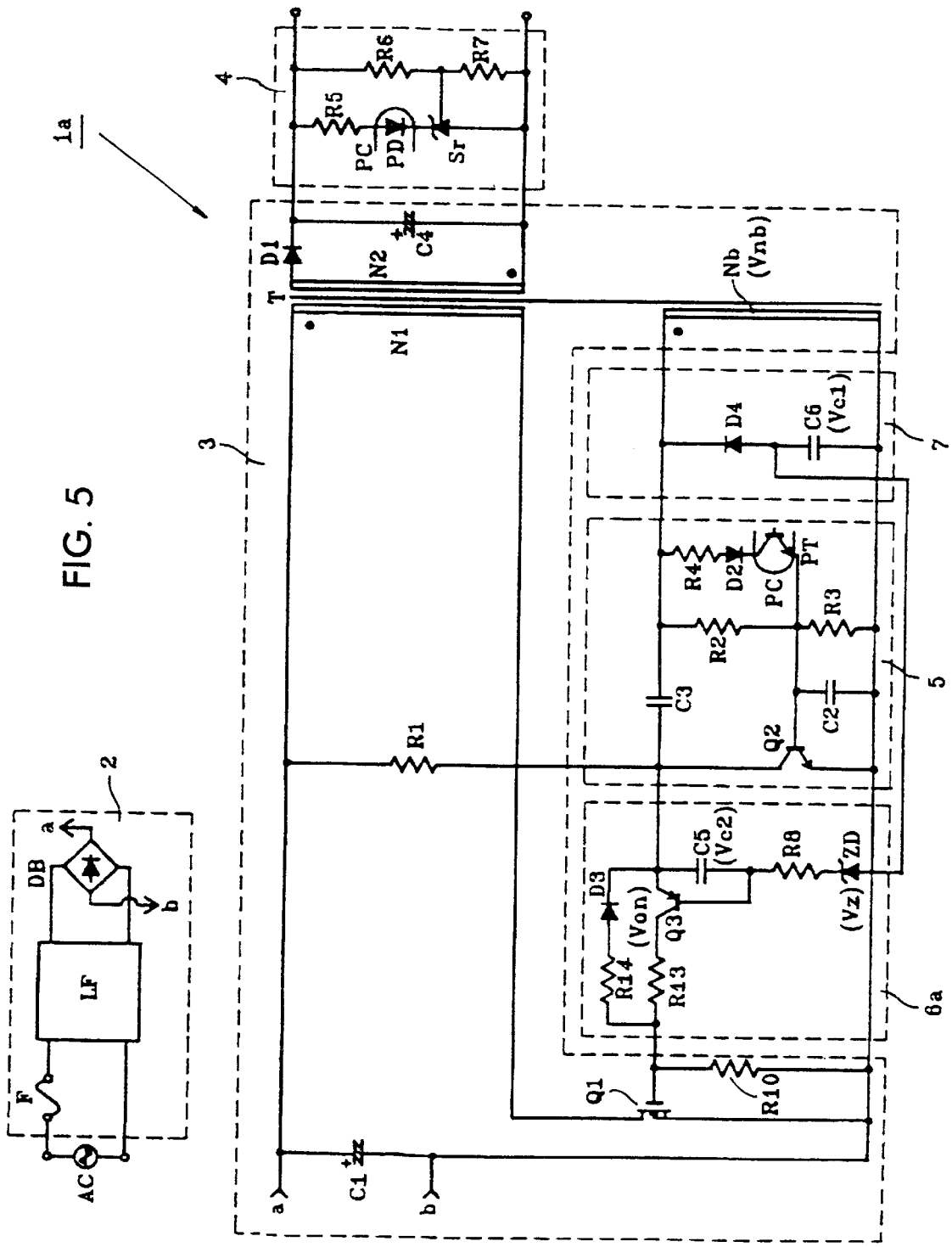
FIG. 5 is a circuit diagram showing a switching power supply unit in accordance with a second embodiment of the present invention.

In the switching power supply unit 1a shown in the FIG. 5, a Zener diode ZD is connected in series to a resistor R8 of a time-constant circuit of a delay circuit 6a.

FIG. 4(b) shows changes in the switching frequency of the above switching power supply unit 1a. In FIG. 4(b), the value of the switching frequency is maintained lower than that of the frequency in the first embodiment shown in FIG. 4(a), until the sum of the charged voltage Vc1 of the capacitor C6 and the voltage Vnb occurring in a feedback winding Nb reaches the Zener voltage Vz of a Zener diode ZD. Furthermore, at a point P, where the sum of the charged voltage Vc1 and the voltage Vnb reaches the Zener potential Vz, quickly current flows into resistor R8, and the time for the charging voltage Vc2 of capacitor C5 to reach the voltage Von, at which the transistor Q3 is turned on, is shorter, so that the switching frequency abruptly rises.

As described above, in the switching power supply unit 1a, the switching frequency under heavy load abruptly rises, and the width of changes in the switching frequency is thereby increased. Thus, even if the switching frequency under light load is set to be significantly low in order to reduce switching losses, there is no problem of increase in conduction losses, since a switching frequency equivalent to that in the conventional switching power supply unit can be obtained under heavy load.

Figure 6:
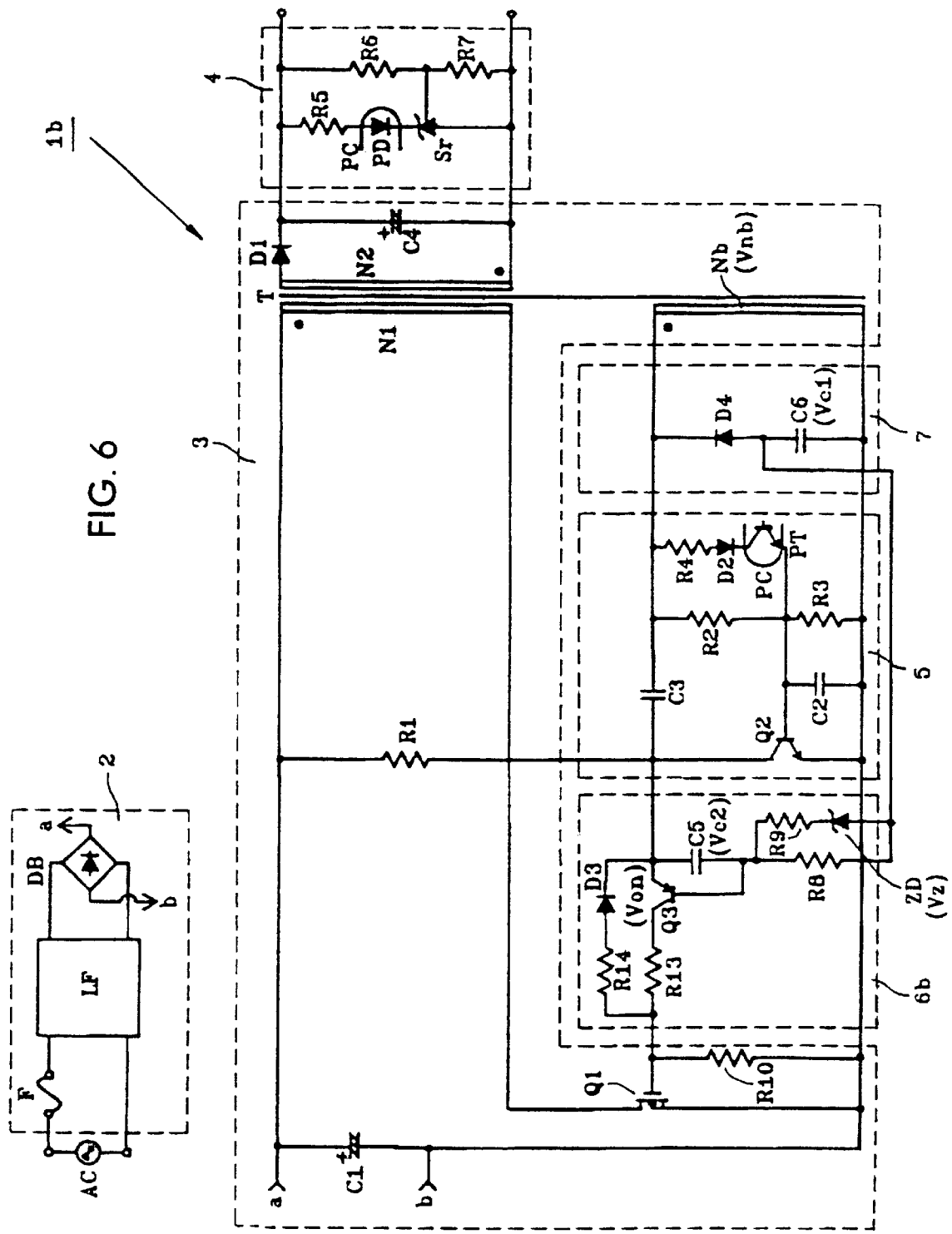
FIG. 6 is a circuit diagram showing a switching power supply unit in accordance with a third embodiment of the present invention.

Referring to FIG. 6, a description will be given of the structure of a switching power supply unit according to a third embodiment of the present invention.

In the switching power supply unit 1b shown in FIG. 6, a series circuit of a resistor R9 and a Zener diode ZD is connected in parallel to a resistor R8 of a time-constant circuit of a delay circuit 6b.

FIG. 4(c) shows changes in the switching frequency of the switching power supply unit 1b having the above structure. In FIG. 4(c), until a point P, where the sum of the charged voltage Vc1 of capacitor C6 and the voltage Vnb occurring in a feedback winding Nb reaches the Zener potential Vz of a Zener diode ZD, a resistor R8 permits current flowing through transistor Q3 to be set very small, and the switching frequency thereby slowly rises. Then, at the point P, current abruptly flows into a resistor R9, and the time for the charging voltage Vc2 of a capacitor C5 to reach the voltage Von, at which the transistor Q3 is turned on, is shorter, with the result that the switching frequency abruptly rises.

Figure 7:
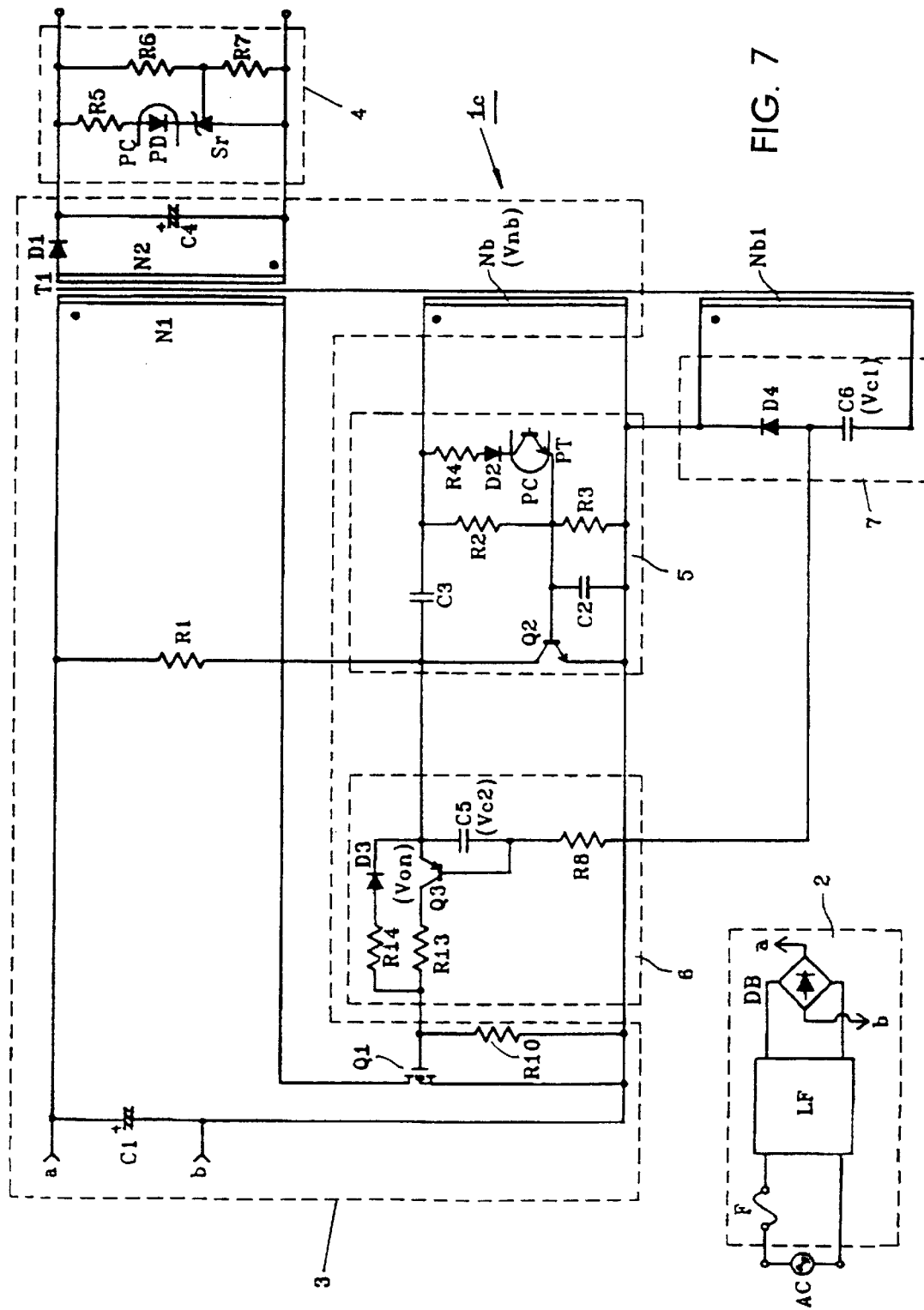
FIG. 7 is a circuit diagram showing a switching power supply unit in accordance with a fourth embodiment of the present invention.

Referring to FIG. 7, the structure of a switching power supply unit according to a fourth embodiment of the present invention will be illustrated below.

In the switching power supply unit 1c shown in FIG. 7, an auxiliary feedback winding Nb1 in addition to a feedback winding Nb is disposed in a transformer T1, and a rectifying and smoothing circuit 7 is connected to the auxiliary feedback winding Nb1. In other words, the auxiliary feedback winding Nb1 is allowed to directly connect to the rectifying and smoothing circuit 7 not via a control circuit 5. As a result, the number of windings forming the auxiliary feedback winding Nb1 is not limited and can be greatly increased.

In this way, increasing the number of windings of the auxiliary feedback winding Nb1 permits the charged voltage Vc1 of the capacitor C6 of the rectifying and smoothing circuit 7 to be larger so as to shorten the time for charging into the capacitor C5 of the time-constant circuit. This leads to a sharp rise in the switching frequency under heavy load. Under this situation, since the width of changes in the switching frequency is increased, even if the switching frequency under light load is set to be significantly low in order to reduce switching losses, a switching frequency equivalent to that in the conventional switching power supply unit can be obtained under heavy load, so that there is no problem of increase in conduction losses.

In addition, when the switching frequency of the switching power supply unit 1c of FIG. 7 is compared with that in the first embodiment shown in FIG. 4(a), the values under heavy load are equal, whereas the value under light load in the former is lower than that in the latter, although this is not shown in the figure.

In the switching power supply units shown in the above second and third embodiments, it is possible to connect the rectifying and smoothing circuit to a different auxiliary feedback winding from the feedback winding to which the control circuit is connected, so that the switching frequency under light load can be even further reduced in the respective switching power supply units.

In the switching power supply unit in accordance with the present invention, the capacitor of the time-constant circuit delaying the turn-on of the main switching element is charged by a voltage generated in the feedback winding of the transformer, as well as by the charged voltage of the capacitor of the rectifying and smoothing circuit connected to the feedback winding.

The charged voltage of the capacitor of the rectifying and smoothing circuit increases in proportion to a load power due to the influence of a leakage inductance of the transformer, or the like. As a result, under light load, the absolute value of the charged voltage of the capacitor of the rectifying and smoothing circuit is relatively small, and the time for charging the capacitor of the time-constant circuit is thereby prolonged, so that the turn-on of the main switching element is delayed. Consequently, the OFF time of the main switching element is prolonged and the switching frequency is thereby lowered. In contrast, under heavy load, the absolute value of the charged voltage of the capacitor of the rectifying and smoothing circuit is relatively large, and the turn-on of the main switching element is thereby accelerated, with the result that the OFF time of the main switching element is shortened.

As describe above, since the switching frequency is decreased under light load and increased under heavy load, switching losses and conduction losses can be reduced, leading to improvement in circuit efficiency.

The switching frequency under heavy load can quickly be made a steep ascent by connecting a Zener diode in series to the resistor of the time-constant circuit, or connecting the rectifying and smoothing circuit to a different winding from the winding to which the control circuit is connected so as to increase the number of the windings. Accordingly, even if the switching frequency under light load is set to be significantly low in order to reduce switching losses, there is no problem of increase in continuity losses, since a switching frequency equivalent to that in the conventional switching power supply unit can be obtained under heavy load.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A switching power supply unit comprising a DC power supply, a transformer having a primary winding, a secondary winding and a feedback winding, a main switching element connected in series to the primary winding, and a control circuit connected between the feedback winding and the control terminal of the main switching element so that a DC output can be obtained, the main switching element having an ON time, an OFF time and a switching frequency;

wherein there are provided a voltage generating circuit coupled to the transformer to output a voltage in accordance with a load power and a delay circuit for reducing the switching frequency by delaying turning on of the main switching element according to a voltage output from the voltage generating circuit thereby prolonging the OFF time and further wherein the voltage generating circuit comprises a rectifying and smoothing circuit connected to the feedback winding.

2. A switching power supply unit comprising a DC power supply, a transformer having a primary winding, a secondary winding and a feedback winding, a main switching element connected in series to the primary winding, and a control circuit connected between the feedback winding and the control terminal of the main switching element so that a DC output can be obtained, the main switching element having an ON time, an OFF time and a switching frequency;

wherein there are provided a voltage generating circuit coupled to the transformer to output a voltage in accordance with a load power and a delay circuit for reducing the switching frequency by delaying turning on of the main switching element according to a voltage output from the voltage generating circuit thereby prolonging the OFF time, and further wherein an auxiliary feedback winding connected between the control circuit and the control terminal of the main switching element is disposed in the transformer, and the voltage generating circuit comprises a rectifying and smoothing circuit connected to the auxiliary feedback winding.

3. The switching power supply unit of claim 1, wherein the delay circuit comprises a switching device disposed between the feedback winding and the control terminal of the main switching element and further comprising a time-constant circuit connected to the switching device.

4. The switching power supply unit of claim 2, wherein the switching device is disposed between the feedback winding and the control terminal of the main switching element and further comprising a time-constant circuit connected to the switching device.

5. The switching power supply unit of claim 3, wherein the time-constant circuit comprises a capacitor and a resistor connected to a control terminal of the switching device.

6. The switching power supply unit of claim 4, wherein the time-constant circuit comprises a capacitor and a resistor connected to a control terminal of the switching device.

7. The switching power supply unit of claim 5, wherein a Zener diode is connected in series to the resistor of the time-constant circuit.

8. The switching power supply unit of claim 6, wherein a Zener diode is connected in series to the resistor of the time-constant circuit.

9. The switching power supply unit of claim 5, further comprising a resistor connected in series with a Zener diode, the resistor and zener diode being connected in parallel to the resistor of the time constant circuit.

10. The switching power supply unit of claim 2, wherein the auxiliary feedback winding has a greater number of turns than the feedback winding thereby to increase an output voltage of the auxiliary feedback winding to increase the voltage of the voltage generating circuit.

11. A switching power supply unit comprising a DC power supply, a transformer having a primary winding, a secondary winding and a feedback winding, a main switching element connected in series to the primary winding, and a control circuit connected between the feedback winding and the control terminal of the main switching element so that a DC output can be obtained, the main switching element having an ON time, an OFF time and a switching frequency;

wherein there are provided a voltage generating circuit coupled to the transformer to output a voltage in accordance with a load power and a delay circuit for reducing the switching frequency by delaying turning on of the main switching element according to a voltage output from the voltage generating circuit thereby prolonging the OFF time, said delay circuit including a switching device coupled between the transformer and the control terminal of the main switching element to couple a control voltage through said control circuit from the feedback winding to the control terminal of the main switching element.

* * * * *